United States Patent [19]

Höhlein et al.

[11] 4,291,135

[45] Sep. 22, 1981

[54] BINDERS FOR COATING COMPOSITIONS

[75] Inventors: Peter Höhlein, Krefeld; Michael Sonntag, Cologne, both of Fed. Rep. of Germany

[73] Assignee: Bayer Aktiengesellschaft, Leverkusen, Fed. Rep. of Germany

[21] Appl. No.: 152,567

[22] Filed: May 22, 1980

Related U.S. Application Data

[63] Continuation of Ser. No. 49,290, Jun. 18, 1979, abandoned.

[30] Foreign Application Priority Data

Jun. 23, 1978 [DE] Fed. Rep. of Germany ....... 2827592

[51] Int. Cl.$^3$ ........................ B05D 3/02; B32B 15/08; B32B 27/00

[52] U.S. Cl. .................................... 525/101; 525/176; 427/388.5; 427/387; 428/458; 428/463

[58] Field of Search ................ 525/101, 176; 427/387, 427/388.5; 428/458, 463

[56] References Cited

U.S. PATENT DOCUMENTS

| | | | |
|---|---|---|---|
| 3,644,566 | 2/1972 | Kincheloe | 260/31.8 S X |
| 3,677,810 | 7/1972 | Campbell et al. | 260/23 X |
| 3,970,709 | 7/1976 | Owston | 156/329 X |
| 4,032,494 | 6/1977 | Gentry | 260/29.1 SB |

*Primary Examiner*—Michael R. Lusignan

*Attorney, Agent, or Firm*—Connolly and Hutz

[57] ABSTRACT

Reaction products of alkyd resins and/or oil-free polyesters, (meth) acrylic acid copolymers and polysiloxans are excellent binders for high quality lacquers particularly for surface lacquers used in the motor car industry.

4 Claims, No Drawings

BINDERS FOR COATING COMPOSITIONS

This application is a continuation of application Ser. No. 49,290 filed June 18, 1979, now abandoned.

This invention relates to a siloxane-modified binder based on polyacrylate resins and polyesters for the preparation of coating compositions which, in combination with the usual aminoplast or polyisocyanate cross-linking agents, harden to form lacquers with excellent optical properties which are eminently capable of fulfilling all the requirements of a surface lacquer used in the motor car industry.

Lacquers based on OH-functional polyacrylate resins are distinguished by their high resistance to mechanical stress, good polishing characteristics and excellent resistance to chemical agents. They are, therefore, eminently suitable as protective coatings for all types of sheet metal.

Surface lacquers used for motor cars must in addition meet special standards in their pigment absorption capacity, fullness, brilliance and gloss retention. These are all properties which are fulfilled to a high degree by alkyd resins and oil-free polyesters.

Surface lacquers for motor cars must in addition have excellent pigment wetting, which is an essential condition for obtaining a high gloss. If the cross-linking agents used are compounds which contain isocyanate groups, the lacquers must in addition have a long pot life.

Since neither polyacrylate resins nor alkyd resins nor oil-free polyesters fulfil all the requirements listed above, there has been a strong demand for a new type of binder.

Binders which are modified with polysiloxanes to improve their resistance to weathering have been known for some time (ACS, Org. Coat. and Plast. Chem. 29, No. 1 (1969), page 143 and Der Fahrzeug und Metall-Lackierer, No. 3 (1967), page 56 but a satisfactory increase in the resistance to weathering is not obtained unless the proportion of polysiloxane is higher than 30% by weight. It was nevertheless surprising, even to the man of the art, that binders which are superior to all the known binders used for surface lacquers for motor cars and which combine in themselves in an almost ideal manner all the advantageous properties mentioned above could be obtained by modifying a polyacrylate/polyester or polyacrylate/alkyd resin mixture with a relatively small quantity of a polysiloxane containing hydroxyl and/or alkoxy groups.

The present invention provides binders for the preparation of coating compositions, obtainable from I 1–97 parts by weight of copolymer resins which contain, per molecule, at least two functional hydroxyl, carboxyl, alkoxy and/or epoxide groups and which are prepared from the following components by copolymerisation:

a. 0–50 parts by weight of at least one hydroxyalkyl ester of acrylic or methacrylic acid containing 2–4 C-atoms in the hydroxyalkyl group,
b. 0–60 parts by weight of at least one compound of the group comprising styrene, $\alpha$-methylstyrene, o-chlorostyrene, p-chlorostyrene, o, m- or p-methylstyrene, p-tertiary-butyl styrene and methylmethacrylate,
c. 10–90 parts by weight of at least one acrylic acid ester having 1 to 12 C-atoms in the alcohol group and/or at least one methacrylic acid ester having 2 to 12 C-atoms in the alcohol group,
d. 0–30 parts by weight of at least one $\alpha,\beta$-mono-olefinically unsaturated mono- or dicarboxylic acid having 3 to 5 C-atoms and/or at least one maleic acid semi-ester having 2 to 14 C-atoms in the alcohol group, or reaction products thereof with a monoglycidyl compound,
e. 0–50 parts by weight of at least one acrylic or methacrylic acid glycidyl ester or reaction products thereof with aliphatic and/or aromatic monocarboxylic acids and amino compounds,
f. 0–40 parts by weight of an acrylic or methacrylic acid amide having 1 to 20 C-atoms in the amino group, especially alkoxylated hydroxymethyl acrylic (or methacrylic) acid amides, which may also be prepared in situ, and
g. 0–60 parts by weight of acrylonitrile;

II 97–1 parts by weight of alkyd resins and/or oil-free polyesters; and

III 0.5–50 parts by weight of at least one polysiloxane containing hydroxyl and/or alkoxy groups by reaction of components I, II and III at temperatures of from 70° to 200° C. with elimination of water or alcohol until the desired degree of condensation has been reached.

The sum of the parts by weight of all the reactants (a) to (g) is 100.

The term "obtainable" is understood to characterise binders obtained according to the above process and binders of identical structure.

The polyacrylate resins I may be prepared by copolymerisation of constituents (a) to (g) by any of the usual processes, radical polymerisation carried out either solvent-free or in solution being preferred. In these processes, monomeric units are copolymerised in the presence of radical formers and optionally regulators at temperatures of from 70° to 160° C., preferably from 100° to 150° C. Preferred starting compounds for the polyacrylate resins I consist of a. 1–35 parts by weight of 2-hydroxyethyl acrylate, 2-hydroxyethyl methacrylate, 2-hydroxypropyl acrylate, 2-hydroxypropyl methacrylate, 4-hydroxybutyl (meth)acrylate, or mixtures thereof;
b. 10–60 parts by weight of styrene or methyl methacrylate or mixtures thereof;
c. 10–60 parts by weight of ethyl acrylate, methyl acrylate, butyl acrylate, butyl methacrylate, 2-ethylhexyl acrylate or 2-ethylhexyl methacrylate or mixtures thereof;
d. 0–20 parts by weight of acrylic acid, methacrylic acid or a maleic acid semi-ester having from 4–8 C-atoms in the alcohol component, or mixtures thereof;
e. 0–40 parts by weight of glycidyl (meth)acrylate or reaction products thereof with saturated and/or unsaturated aliphatic and/or aromatic monocarboxylic acids obtained by a reaction which is carried out at temperatures of from 80° to 160° C. either before or, preferably, after copolymerisation (the usual catalysts may be used);
f. 0–40 parts by weight of methoxymethyl acrylic acid amide or methoxymethyl methacrylic acid amide or mixtures thereof in which the alkoxylated monomers may be copolymerised or the alkoxylated compounds may be prepared by a reaction with formaldehyde in the presence of methanol after the copolymerisation of acrylic or methacrylic acid amide, or mixtures thereof; and g. 0–45 parts by weight of acrylonitrile.

Monomers (a) to (g) are built into the copolymer in substantially the same proportions as those in which they are used for polymerisation, and the units incorporated by polymerisation have a substantially statistical distribution.

The monomers of group (a) serve to incorporate the chemically reactive hydroxyl groups. It is in no way deleterious to the invention if modifications are carried out on these OH groups of the OH-functional monomers before or after the monomers have been chemically incorporated within a polymer analogous reaction. Preferred monomers of group (a) include 2-hydroxyethyl acrylate, 2-hydroxyethyl methacrylate, 2-hydroxypropyl methacrylate, 4-hydroxybutyl acrylate and 4-hydroxybutyl methacrylate.

When used alone, the monomers of group (b) give rise to homopolymers with high glass transition temperatures of 70° to 110° C. Styrene and/or methyl methacrylate are particularly preferred.

The monomers of group (c) serve to elastify the resins and homopolymers obtained from them are elastic products with glass transition temperatures of from +40° to −80° C. The following are preferred:

Methylacrylate, ethyl(meth)acrylate, n- or isopropyl(meth)acrylate, butyl(meth)acrylate, isobutyl(meth)acrylate, tertiary-butyl(meth)acrylate and 2-ethylhexyl(meth)acrylate.

Butyl methacrylate, butyl acrylate and 2-ethylhexyl(meth)acrylate are preferably used.

The incorporation of acid monomers of group (d) increases the reactivity or functionality of the polymers. The following are preferred monomers of group (d):

Acrylic acid, methacrylic acid, maleic acid, monoesters of maleic acid with aliphatic alcohols having 4 to 8 C-atoms, itaconic acid and fumaric acid.

These monomers may be reacted with glycidyl compounds such as glycidol or glycidyl esters of monocarboxylic acids having 8 to 20 C-atoms, preferably 10 to 16 C-atoms, either before, during or after polymerisation.

The glycidyl compounds of group (e) enable cross-linking with compounds containing carboxyl groups to be achieved through their chemically reactive epoxide groups and they serve to modify the polyacrylate resin by the addition of fatty acids, air-drying polyacrylate resins being obtainable by the addition of unsaturated fatty acids.

The copolymerisation with monomers of group (f) results in self-cross-linkable polyacrylate resins which have exceptionally good solvent resistance.

Lastly, the incorporation of acrylonitrile has a considerable influence on the compatibility with solvents.

Preferred initiators for carrying out the radical polymerisation include, for example, symmetrical aliphatic azo compounds such as the following:

Azo-bis-isobutyric acid nitrile, azo-bis-2-methylvaleronitrile, 1,1'-azo-bis-1-cyclohexane nitrile and 2,2'-azo-bis-isobutyric acid alkyl ester; symmetrical diacyl peroxides such as acetyl, propionyl or butyryl peroxide, benzoyl peroxides which are substituted with bromo, nitro, methyl or methoxy groups, and lauroyl peroxide; symmetrical peroxydicarbonates, e.g. diethyl, diisopropyl, dicyclohexyl and dibenzyl peroxydicarbonate; tertiary-butyl peroctoate or tertiary butyl phenyl peracetate and peroxycarbonates such as tertiary butyl-N-(phenylperoxy)-carbamate or tertiary butyl-N-(2,3-dichloro- or -4-chlorophenyl-peroxy)-carbamate. The following peroxides are also preferred: tertiary-butyl hydroperoxide, di-tertiary-butyl peroxide, cumene hydroperoxide, di-cumene peroxide and tertiary butyl perpivalate.

The average molecular weights and the molecular non-uniformities of the polyacrylate resins were determined by means of gel permeation chromatography (GPC) on styragels, using THF as eluting agent. In this process, a universal calibration is first set up (according to Z. Grubisic, P. Rempp and H. Benoit, J. polymer Sci. Part B, Polymer Letters 5 (1967) 753), and the molecular weight values Mw and Mn are then determined from the distribution of the chromatograms. The polymers have average molecular weights of $\overline{Mn}=500$ to 50,000, preferably $\overline{Mn}=800$ to 25,000 and non-uniformities $(Mw/Mn)-1$ of 0.5–10.

Polymerisation may also be carried out in the presence of an inert solvent such as propanol, isopropanol, n- or isobutanol, methylethyl ketone, toluene, xylene, butyl acetate, etc. The solvents may be used in quantities of from 5 to 40% by weight, based on monomers (a) to (g).

After their preparation, possibly followed by a modification, the resins are freed from volatile constituents, generally at temperatures of from 140°–200° C. This may be carried out, for example, at normal pressure in evaporation coils by injecting an inert gas such as nitrogen or steam in quantities of from 0.1–1 $m^3$ to 1 kg of resin melt, or it may be carried out under vacuum in evaporation apparatus such as falling film evaporators, thin layer evaporators, screw evaporators, pressure release evaporators or spray evaporators.

Removal of residual monomers from copolymers which have been prepared in solution is generally carried out by distillation of the reaction mixture.

The viscosities required for subsequent processing can be adjusted by dilution with the usual solvents such as aromatic compounds, petroleum hydrocarbons, esters, ketones, alcohols and glycol esters.

The term "Polyester II" is used below to denote polyesters which are free from fatty acids and oils and the term "Alkyd resins II" is used to denote polyesters modified with fatty acid or oil.

The terms "alkyd resins II" and "Polyesters II" mean the type of polycondensates prepared from alcohols and carboxylic acids by known methods of polycondensation as defined e.g. in Römpp's Chemielexikon, Volume 1, page 202, Franck'sche Verlagbuchhandlung Stuttgart, 1966 or described by D. H. Solomon, in The Chemistry of Organic Filmformers, pages 75–101, John Wiley & Sons Inc. New York, 1967.

The preferred alcohols for the synthesis of alkyd resins II and polyesters II are aliphatic, cycloaliphatic and/or aromatic alcohols having 1–6, preferably 1–4 OH groups attached to non-aromatic carbon atoms and 1–24 C-atoms per molecule, e.g. glycols such as ethylene glycol, propylene glycol, butanediols, neopentyl glycol, 2-ethylpropanediol-(1,3) and hexanediols; ether alcohols such as di- and triethylene glycols and ethoxylated bisphenols; perhydrogenated bisphenols, trimethylol ethane, trimethylol propane, glycerol, pentaerythritol, dipentaerythritol, mannitol and sorbitol, and monovalent chain-breaking alcohols such as propanol, butanol, cyclohexanol and benzyl alcohol.

The preferred acid components for the synthesis of the alkyd resins II and polyesters II are aliphatic, cycloaliphatic and/or aromatic polybasic carboxylic acids, preferably di-, tri- and tetra carboxylic acids having 4–12 C-atoms per molecule or derivatives thereof which are capable of esterification (e.g. anhydrides or esters), e.g. phthalic acid anhydride, isophthalic acid, terephthalic acid, tetrahydro- and hexahydrophthalic acid anhydride, trimellitic acid anhydride, pyromellitic acid anhydride, maleic acid anhydride, adipic acid and succinic acid, and halogenated acids such as chlorophthalic acids and hexachloroendomethylene tetrahydrophthalic acid.

Preferred monocarboxylic acids for the preparation of polyesters II and alkyd resins II are aliphatic, cycloaliphatic and/or aromatic monocarboxylic acids having 6–24 C-atoms per molecule, such as benzoic acid, butylbenzoic acid, toluic acid, hexahydrobenzoic acid, abietic acid, and lactic acid and fatty acid esters such as linseed oil, soya bean oil, wood oil, safflower oil, castor oil, ricinene oil, cotton seed oil, ground nut oil, tall oil fatty acid and linseed oil fatty acid and the fatty acids of soya bean oil, wood oil, safflower oil and ricinene oil, and products obtained from natural unsaturated oils or fatty acids by conjugation or isomerisation. Coconut fatty acids and α-ethyl-hexanoic acid are examples of suitable saturated fatty acids.

The molecular weight of the polyesters II and alkyd resins II determined as the number average is 400–10,000 (up to molecular weights of 5,000, determined by vapour pressure osmometry in dioxane and acetone, the lower value being taken as correct when differing values are obtained. Molecular weights above 5,000 are determined by membrane osmometry in acetone).

The polyesters II and alkyd resins II may be prepared in known manner by the usual methods of condensation.

This is generally carried out by reacting the mixture of raw materials at temperatures of from 140° to 250° C. with elimination of water, under an atmosphere of a protective gas such as nitrogen, until the desired acid number or the required viscosity is reached, but the resins may equally well be prepared by an azeotropic method.

The polyester and/or alkyd resin constituents II of the binders according to the invention may, if desired, be prepared in the presence of the usual catalysts employed for accelerating polycondensation reactions, e.g. those described in the following literature: H. Wagner and H. F. Sarx, Lackkunstharze, C. Hanser-Verlag, 5th Edition (1971), P. 90 and W. R. Sorenson and T. W. Campbell, Preparative Methods of Polymer Chemistry, Intersc. Publ. New York 1961, 111–127 and the literature cited there.

The polyesters and alkyd resins II prepared in this way may be further processed either as 100% resins or as resin solutions. The usual lacquer solvents are suitable, e.g. alcohols having 1–4 C-atoms, such as methanol, ethanol, n and iso-propanol and the butanols; acetic acid esters having 2–4 C-atoms in the alcohol component, such as ethyl acetate and butyl acetate or ethyl glycol acetate; ethylene glycol monoalkyl ethers having 1–4 C-atoms in the alkyl group, such as ethylene glycol monomethyl, monoethyl and monobutyl ether; aliphatic and alicyclic ketones such as methyl ethyl ketone, methyl isobutyl ketone, cyclohexanone and acetone; lower ethers such as tetrahydrofuran; chlorinated hydrocarbons such as trichloroethylene; aromatic hydrocarbons such as benzene, toluene, xylene, or mixtures of the abovementioned solvents.

The polysiloxanes III used are usually the products of hydrolysis or alcoholysis of trifunctional silanes which have alkyl or aryl groups on the silicon atom; in addition to trifunctional silanes, there may also be used a proportion of di-functional silanes and possibly small quantities of monofunctional silanes. Hydrolysis or alcoholysis may be carried out in known manner, e.g. as described by W. Noll in "Chemie und Technologie der Silicone," Verlag Chemie, 2nd Edition 1968, page 164.

Thus, for example, the silanes may be reacted with a water-alcohol mixture. The proportion of water in the water-alcohol mixture limits the proportion of SiOR groups. Another method of preparation consists of reacting the silanes with a mixture of tertiary aliphatic alcohols in the form of chains with 4–8 carbon atoms on the one hand and primary and/or secondary aliphatic alcohols in the form of chains with 1–8, preferably 1–4 carbon atoms. A process of this kind has been described, e.g. in German Offenlegungsschrift No. 2,020,224 or in "Chemie und Technologie der Silicone" by W. Noll, 2nd Edition Verlag Chemie, Weinheim, 1968, page 173.

The polysiloxanes III used are preferably compounds corresponding to the following formula:

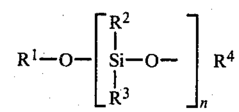

$$R^1-O-\left[\begin{array}{c} R^2 \\ | \\ Si-O- \\ | \\ R^3 \end{array}\right]_n R^4$$

wherein n represents integers of from 2–5, $R^1$, $R^4$ denote straight chain and/or branched chain alkyl groups having 1–4 C-atoms, phenyl, tolyl and/or benzyl, and $R^2$, $R^3$ denote straight chain and/or branched chain alkyl groups having 1–4 C-atoms, straight chain C-atoms, phenyl, tolyl and/or benzyl and either $R^2$ or $R^3$ optionally denote hydroxyl.

The following are suitable straight chain or branched chain alkyl and alkoxy groups: Methyl, ethyl, propyl, isopropyl, butyl, isobutyl, methoxy, alkoxy, propoxy, isopropyloxy, butoxy and isobutyloxy.

It is preferred to use polysiloxanes III in which $n=2-4$, $R_2$ and $R_3$=phenyl, methyl and/or methoxy, and $R_1$ and $R_4$=methyl and/or phenyl, which have been described as a type, for example in FATIPEC Kongress 1970, page 171 et seq and by L. H. Braun, in ACS, Org. Coat. and Plast. Chem. 29 (1969), No. 1, page 135.

The reaction of the reactive polyesters and/or alkyd resins II with OH-functional polyacrylate resins I in the presence of polysiloxanes III may be carried out solvent-free at 160°–200° C. or, preferably, in solution at 80°–100° C. Preferred solvents include e.g. xylene, mixtures of aromatic solvents such as those obtained under various trade names, cyclohexanone, methyl glycol acetate and ethyl glycol acetate.

Catalysts may advantageously be used for the reaction of the resins I and II with the polysiloxanes III but the use of these catalysts does not determine the properties of the finished coatings. Catalysts which may be used for this purpose include e.g. soluble salts of cobalt, zinc, lead, manganese, tin and titanium. Particularly suitable for this purpose are tetralkyl titanates which have 2–5 C-atoms in the carbon chain, e.g. tetraethyl titanate, tetraisopropyl titanate, tetrapropyl titanate, tetraisobutyl titanate, and tetrabutyl titanate.

The reaction of the resins I and II with the polysiloxane component III may, of course, be stopped at various stages but it would generally appear to be desirable to stop the reaction only shortly before the reaction mixture begins to gel. The correct time for stopping the reaction can easily be determined by means of a short test series. The quantity of water or alcohol split off is a convenient measure for ascertaining the progress of the reaction. It has in many cases been found advantageous to stop the reaction when from 20–80%, preferably from 30–70% of the theoretically possible quantity of water or alcohol has been split off, but if the quantity of reaction mixture is small or the quantity of polysiloxane is small, it would often be more advantageous to use the viscosity as a measure for the progress of the reaction.

The novel binders according to the invention may be used as the sole binders of a lacquer system but they may, of course, also be combined with various resins to modify the properties, as is customary in lacquer chemistry. The binders according to the invention are generally used as systems which are cross-linked by external agents. The cross-linking components may be, for example, polyisocyanates, polyisocyanurates, melamine resins, benzoguanamine resins, urea resins, epoxide resins, carboxylic acids, polyisoxazolines, etc, but air-drying properties may also be imparted to the binders by the chemical incorporation of unsaturated fatty acids.

The lacquer films may be produced on suitable substrates, such as metal, wood, paper, glass, ceramics, stone, concrete, synthetic resins, etc. by the usual methods such as brush coating, spraying, immersion, spread coating with a doctor wiper, etc.

The percentage contents and parts given in the Examples are based on weight unless otherwise indicated.

EXAMPLES

Alkyd resin A

An oil-free polyester having an acid number of about 10 and a viscosity corresponding to an outflow time (DIN 53, 211, 50% in xylene) of 120–130 seconds is prepared from 1,417 parts of phthalic acid anhydride, 990 parts of benzoic acid, 990 parts of fatty acid, 728 parts of trimethylol propane and 757 parts of pentaerythritol by esterification at 200° C. under a nitrogen atmosphere.

Copolymer B 1,120 parts of styrene, 350 parts of hydroxypropyl methacrylate, 282 parts of butyl acrylate and 18 parts of mercaptoethanol are copolymerised by an isothermic inflow process at 110° C. under a nitrogen atmosphere by introducing the monomer mixture in the course of about 4 hours into 1,020 parts of xylene which has been preheated to 110° C. At the same time, 70 parts of tertiary butyl peroctoate in 164 parts of xylene are added separately in the course of up to 5 hours.

A copolymer having a viscosity corresponding to an outflow time (DIN 53 211, 50% in xylene) of 120–130 seconds and a molecular weight Mn of 5,430 is obtained. The solids content is adjusted to 60% by distillation of the reaction mixture.

COMPARISON EXAMPLE 1,600 parts of a copolymer resin in the form of a 60% solution in xylene are added to 1,200 parts of a polyester in the form of a 60% solution in xylene with stirring under a nitrogen atmosphere and the mixture is stirred for about 2 hours at 60° C. A product having a viscosity of 4,750 mPa.s (Höppler Viscosimeter) and a solids content of 60% by weight is obtained.

Cloudiness appears after a storage time of about 14 days.

EXAMPLE 1

79 parts of a polysiloxane resin (Methoxy-substituted polysiloxane resin having a molecular weight of about 600 and containing 17% by weight of silicon and 33 mol % of methyl groups) and 0.08 parts of tetrabutyl titanate are added to a mixture of 2,497 parts of copolymer resin B (60% in xylene) and 1,741 parts of alkyd resin A (60% in xylene). The mixture is maintained at 120° C. for 4 hours with stirring under a nitrogen atmosphere. A clear solution having a viscosity corresponding to an outflow time (DIN 53 211, 50% in xylene) of 130 seconds is obtained on cooling.

The clear product showed no signs of cloudiness after two months and when tested gave the results shown in Tables 2 and 3.

EXAMPLE 2

A product having a viscosity corresponding to an outflow time of 117 seconds (DIN 53 211, 50% in xylene) is prepared from 1,904.8 parts of copolymer resin B (60% in xylene), 1,333.4 parts of alkyd resin A (60% in xylene), 100 parts of polysiloxane resin (as in Example 1) and 0.1 part of tetrabutyl titanate by stirring at 120° C. for 5 hours under a nitrogen atmosphere. This product gave a clear solution on cooling.

The clear product showed no signs of cloudiness after two months and when tested it gave the results shown in Tables 2 and 3.

EXAMPLE 3

A mixture of 1,333.4 parts of copolymer resin B (60% in xylene), 2,000 parts of alkyd resin A (60% in xylene), 60 parts of polysiloxane (as in Example 1) and 0.06 parts of tetrabutyl titanate is maintained at 120° C. for 3 hours under a nitrogen atmosphere with stirring. A clear solution having a viscosity corresponding to an outflow time (DIN 53 211, 50% in xylene) of 85 seconds is obtained on cooling.

The clear product shows no signs of cloudiness after two months and when tested gives the results shown in Tables 2 and 3.

Testing

1. Clear lacquers

To test the lacquer technical properties of the clear lacquer films, alkyd resin A and the products obtained in the Comparison Example and in Examples 1 to 4 were dried as 2-component lacquers with isocyanate (Desmodur N, trade product of BAYER AG) at room temperature. The binder components in the proportions indicated in Table 1 were homogenised by stirring, applied to glass plates with a doctor wiper and dried in air at room temperature (about 20°–25° C.). The results of the tests are shown in Table 2.

The clear lacquers were applied to form films of almost the same thickness when dry, of about 45$\mu$, and tested. The values for pendulum hardness indicated were obtained in seconds by the method of König after 1, 3 and 7 days of air drying (see W. König, farbe+-lacke 59 (1953), page 435). In this test, the lower the value obtained, the softer is the film. The lowest values are obtained for alkyd resin A alone, and these can be increased by the addition of copolymers (Comparison Example). A further increase can be achieved by the polysiloxane modification (Examples 1-3).

"Sand dry" means that grains of sand on the lacquer can be removed by sweeping with a fine hair brush without the grains adhering to the surface of the film. The length of time after which such an operation can be successfully carried out is shown in Table 2. The poorest value is obtained with alkyd resin A. This can be improved from 3½ hours to 1½ hours by the addition of copolymers (Comparison). The polysiloxane modifications (Examples 1-3) maintain their high level.

To determine the gel time, a slowly rotating plastics disc connected by a rod to an indicator instrument is introduced into the lacquer composition. Rotation of the disc is stopped when a certain viscosity is reached, and the time of rotation can be read on the indicator. The shortest time, amounting to 13 hours, is obtained for the copolymer/polyester mixture (comparison). Polysiloxane modification (Examples 1-3) increases the pot life to 16 hours.

Table 2 also shows that the polyester-copolymer lacquers are cloudy by the time they reach the market (Comparison). This cloudiness disappears in the case of polysiloxane modification (Examples 1-3) and does not reappear even after a storage time of three months. Heating the product of the comparison experiment to 120° C. results in a clear solution but this becomes cloudy again either immediately on cooling or at the latest after 14 days.

2. Pigmented lacquer films.

To test the lacquer technical properties, the pigmented lacquer films having the compositions shown in Table 3 were triturated in a three roll mill and after the addition of Desmodur N they were dried at room temperature.

To determine the pigment wetting in pigmented lacquer solutions, the solutions were poured onto glass plates and dried at room temperature while the plates were set vertically. The homogeneity of the film was assessed after drying. Very good pigment wetting is an indication of complete homogeneity while very poor pigment wetting indicates flocculation of the film (inhomogeneity). The thickness of the dried films was approximately 45μ. Table 3 shows that optimum pigment wetting is obtained for all the tested pigments in the case of the polysiloxane modified Examples 2 and 3 while some of the comparison experiments (polyester/-copolymer mixture) give very poor results.

TABLE 1

Composition of Clear Lacquer Films (Parts by Weight)

| | Alkyd Resin A | Comparison | Examples 1 | 2 | 3 |
|---|---|---|---|---|---|
| Binder, 60% in xylene | 166.7 | 167.0 | 167.0 | 167.0 | 167.0 |
| Levelling agent, 1% in EGA | 2.8 | 2.8 | 2.8 | 2.8 | 2.8 |
| EGA/xylene/BA = 1:1:1 | 125.0 | 125.0 | 125.0 | 125.0 | 125.0 |
| Desmodur N, 75% in EGA/ xylene = 1:1 | 50.0 | 52.0 | 52.0 | 52.0 | 52.0 |
| Solids content (%) | 40 | 40 | 40 | 40 | 40 |

EGA = Ethylglycol acetate
BA = Butyl acetate
Desmodur N = polyfunctional aliphatic isocyanate (trade product of BAYER AG).

TABLE 2

Test Results of Clear Lacquer Films

| | Alkyd resin | Comparison | Examples 1 | 2 | 3 |
|---|---|---|---|---|---|
| Layer thickness (μ) | 45 | 49 | 45 | 35 | 40 |
| Gel time (h) | 18 | 13 | 16 | 16 | 16 |
| Sand dry (h) | 3.5 | 1.5 | 1.5 | 1.5 | 2.5 |
| Pendulum hardness according to Konig (sec) after 1 day | 93 | 70 | 74 | 56 | 62 |
| 3 days | 126 | 137 | 151 | 151 | 127 |
| 7 days | 140 | 154 | 160 | 161 | 168 |
| Appearance when ready for delivery after 14 days | Clear | Cloudy | Clear | Clear | Clear |

TABLE 3

Composition (parts by weight) and test results for pigmented films

| | Comparison Example | | | | Example 2 | | | | Example 3 | | | |
|---|---|---|---|---|---|---|---|---|---|---|---|---|
| Binder, 60% in xylene | | | | 167.0 | | | | 167.0 | | | | 167.0 |
| Bentones, 10% in mineral spirits | | | | 5.6 | | | | 5.6 | | | | 5.6 |
| Levelling agent 1% in EGA | | | | 2.8 | | | | 2.8 | | | | 2.8 |
| Silicone oil, 10% in Xylene | | | | 0.7 | | | | 0.7 | | | | 0.7 |
| EGA/xylene/BA (1:1:1) | | | | 95.0 | | | | 95.0 | | | | 95.0 |
| Desmodur N, 75% in EGA/ xylene (1:1) | | | | 52.0 | | | | 52.0 | | | | 52.0 |
| $TiO_2$, RN 57 | 84.0 | 7.0 | 65.8 | — | 84.0 | 7.0 | 65.8 | — | 84.0 | 7.0 | 65.8 | — |
| Paliogen orange 2640 | — | 2.8 | — | — | — | 2.8 | — | — | — | 2.8 | — | — |
| Paliogen orange 3040 | — | 11.2 | — | — | — | 11.2 | — | — | — | 11.2 | — | — |
| Heliogen blue 6975 LF | — | — | 3.4 | — | — | — | 3.4 | — | — | — | 3.4 | — |
| Paliogen violet 5890 | — | — | 0.2 | — | — | — | 0.2 | — | — | — | 0.2 | — |
| Flame soot 101 | — | — | 0.6 | — | — | — | 0.6 | — | — | — | 0.6 | — |
| Chrome yellow 5072 | — | — | — | 84.0 | — | — | — | 84.0 | — | — | — | 84.0 |
| Pigment based on solid resin (%) | 60 | 15 | 50 | 60 | 60 | 15 | 50 | 60 | 60 | 15 | 50 | 60 |
| Pigment wetting[1] (poured on glass) | 2 | 4 | 1 | 5 | 0 | 1 | 0 | 0 | 0 | 1 | 0 | 0 |

[1]General scale of assessment:
0 = excellent,
1 = very good,
2 = good,
3 = satisfactory,
4 = unsatisfactory,
5 = very poor.

Polyesters and alkyd resins C–E are given as examples of other resins of this type. They may be used instead of alkyd resin A as a component of the binders according to the invention.

Polyester C 2,079 parts of phthalic acid anhydride, 666 parts of isophthalic acid, 293 parts of adipic acid, 622 parts of ethylene glycol, 853 parts of neopentyl glycol and 474 parts of hexanediol-(1,6) are heated in a solvent-free condensation apparatus under a nitrogen atmosphere with a slow increase of the temperature to 240° C. within 20 hours and kept at this temperature until an acid number <10 is reached. The resulting polyester is dissolved to a concentration of 60% in xylene.

Alkyd resin D

An alkyd resin with an acid number of about 10 and a viscosity corresponding to an outflow time (DIN 53 211 determined as a 50% solution in xylene) of 130-150 seconds is prepared from 1,510 parts of phthalic acid anhydride, 1,444 parts of p-tert.-butyl benzoic acid, 1,075 parts of fatty acid as defined below, 759 parts of trimethylol propane and 763 parts of pentaerythritol by esterification at 200° C. under a nitrogen atmosphere. The alkyd resin is then dissolved to a concentration of 60% in xylene.

The fatty acid was a fatty acid mixture having an acid number of 183-189 and containing 1.5% by weight of lauric acid, 20% by weight of myristic acid, 45% by weight of palmitic acid, 30% by weight of stearic acid and 3.3% by weight of oleic acid.

Polyester E 832 parts of 2-ethylpropanediol-(1,3), 268 parts of trimethylol propane, 770 parts of phthalic acid anhydride and 642 parts of adipic acid are heated to 230° C. within 8 hours with stirring while nitrogen is passed through, and then kept at 230° C. until the reaction mixture has a viscosity corresponding to an outflow time of 100 seconds (measured as a 60% solution in xylene, DIN 53 211) and an acid number of about 10. A 60% solution in xylene is prepared after cooling.

These polyesters and alkyd resins can be reacted with the copolymer resins mentioned in the Comparison Example and in the following Examples, using the proportions indicated in the patent specification, with the addition of a polysiloxane resin and catalyst to produce the coating compositions claimed.

In the Examples described below, variously prepared copolymer resins are reacted with alkyd resin A and polysiloxane resin and tetrabutyl titanate to produce the coating compositions claimed.

EXAMPLE 4

2,397 parts of alkyd resin A (60% in xylene), 109 parts of polysiloxane resin (as in Example 1) and 0.11 parts of tetrabutyl titanate are added to 3,438 parts of copolymer resin F which has been prepared from 1,542 parts of methyl methacrylate, 481 parts of hydroxypropyl methacrylate, 388 parts of butyl acrylate and 25 parts of tertiary dodecyl mercaptan by copolymerisation in 1,405 parts of xylene with the addition of 226 parts of tertiary butyl peroctoate under the same reaction conditions as those used for the preparation of copolymer B. The mixture was maintained at 120° C. for 4 hours under a nitrogen atmosphere with stirring. A clear solution having a viscosity corresponding to an outflow time of 140-160 seconds (measured as a 50% solution in xylene) is obtained on cooling.

EXAMPLE 5

1,909 parts of alkyd resin A (60% in xylene), 87 parts of polysiloxane resin (as in Example 19 and 0.09 parts of tetrabutyl titanate are added to 2,738 parts of copolymer resin G which has been prepared from 1,228 parts of styrene, 383 parts of hydroxyethyl methacrylate, 309 parts of butyl acrylate and 20 parts of mercaptoethanol by copolymerisation in 1,119 parts of xylene by the addition of 81 parts of tert.-butyl peroctoate, using the same reaction conditions as for the preparation of copolymer B. The mixture is then worked up under the same reaction conditions as in Example 4. A clear solution having a viscosity corresponding to an outflow time of about 145 seconds (measured as a 50% solution in xylene) is obtained on cooling.

EXAMPLE 6

2259 parts of alkyd resin A, 103 parts of polysiloxane resin (as in Example 1) and 0.1 part of tetrabutyl titanate are added 3,240 parts of copolymer resin H which has been prepared from 1,453 parts of methyl methacrylate, 453 parts of hydroxyethyl methacrylate, 366 parts of ethyl acrylate and 24 parts of n-dodecyl mercaptan by copolymerisation in 1,324 parts of xylene with the addition of 213 parts of tertiary butyl peroctoate under the reaction conditions employed for copolymer B. The mixture is worked up under the same conditions as in Example 4. A clear solution having a viscosity corresponding to an outflow time of 156 seconds (determined as a 50% solution in xylene) is obtained.

EXAMPLE 7

2,210 parts of alkyd resin A, 101 parts of polysiloxane resin (as in Example 1) and 0.1 part of tetrabutyl titanate are added to 3,071 parts of copolymer resin I which has been prepared from 711 parts of styrene, 711 parts of methyl methacrylate, 443 parts of hydroxypropyl methacrylate, 358 parts of 2-ethylhexyl acrylate and 34 parts of tertiary dodecyl mercaptan by copolymerisation in 1,295 parts of xylene by the addition of 208 parts of tertiary butyl peroctoate, using the same reaction conditions as for copolymer B. The mixture is then worked up as in Example 4. The reaction mixture obtained has a viscosity corresponding to an outflow time of 133 seconds (determined as a 50% solution in xylene) on cooling.

EXAMPLE 8

3,034 parts of alkyd resin A, 137 parts of polysiloxane resin (as in Example 1) and 0.14 parts of tetrabutyl titanate are added to 4,352 parts of copolymer resin K which has been prepared from 1,955 parts of styrene, 608 parts of glycidyl methacrylate, 491 parts of butyl acrylate and 47 parts of mercaptoethanol by copolymerisation in 1,778 parts of xylene with the addition of 286 parts of tertiary butyl peroctoate under the reaction conditions employed for copolymer B. This mixture is worked up as in Example 4. The clear solution obtained on cooling has a viscosity corresponding to an outflow time of 146 seconds 8determined as a 50% solution in xylene).

EXAMPLE 9

1,980 parts of alkyd resin A, 90 parts of polysiloxane resin (as in Example 1) and 0.09 parts of tetrabutyl titanate are added to 2,840 parts of copolymer resin L which has been prepared from 2,840 parts of methyl methacrylate, 397 parts of hydroxyethyl methacrylate, 321 parts of ethyl acrylate and 21 parts of tertiary dodecyl mercaptan by copolymerisation in 1,161 parts of xylene with the addition of 187 parts of tertiary butyl peroctoate under the reaction conditions employed for copolymer B. The mixture is then worked up as in Example 4. The resulting clear resin solution has a viscosity corresponding to an outflow time of 137 seconds (determined as a 50% solution in xylene).

EXAMPLE 10

2,606 parts of alkyd resin A, 118 parts of polysiloxane resin (as in Example 1) and 0.12 parts of tetrabutyl titanate are added to 3,738 parts of copolymer resin M which has been prepared from 839 parts of styrene, 839 parts of methyl methacrylate, 944 parts of glycidyl methacrylate and 40 parts of mercaptoethanol by copolymerisation in 1,527 parts of xylene with the addition of 246 parts of tertiary butyl peroctotate under the reaction conditions employed for copolymer B. The mixture is then worked up as in Example 4.

The resulting clear resin solution has a viscosity corresponding to an outflow time of 142 seconds (determined as a 50% solution in xylene).

EXAMPLE 11

2,630 parts of the copolymer resin from Example 10 are boiled at 140° C. with 1,557 parts of an isomerised, dehydrating fatty acid mixture consisting of 8% by weight of saturated fatty acid, 31% by weight of a mono-unsaturated $C_{18}$-fatty acid, 51% by weight of a di-unsaturated $C_{18}$-fatty acid and 10% by weight of a tri-unsaturated $C_{18}$-fatty acid, in which 45% by weight of the di-unsaturated and tri-unsaturated fatty acids are conjugated. Boiling is continued until the mixture has an acid number of about 10. The resulting resin is reacted with 83 parts of polysiloxane resin (as in Example 1) and 0.08 parts of tetrabutyl titanate at 140° C. The clear solution obtained is then dissolved to a concentration of 60% in xylene. The viscosity corresponds to an outflow time of 153 seconds (determined as a 50% solution in xylene).

We claim:

1. Binders for the preparation of coating compositions, obtainable by reacting components A, B and C at 70°-200° C. with elimination of water or alcohol until at least 20% of the theoretically possible quantity of water or alcohol has been eliminated, wherein component A is 1-97 parts by weight of copolymer resins which contain, per molecule, at least two functional hydroxyl, carboxyl, alkoxy and/or epoxide groups, which resins are prepared by copolymerization of a. 0-50 parts by weight of at least one hydroxyalkyl ester of acrylic or methacrylic acid having 2-4 C-atoms in the hydroxyalkyl group, b. 0-60 parts by weight of at least one compound of the group comprising styrene, α-methylstyrene, o-chlorostyrene, p-chlorostyrene, o-, m- or p-methylstyrene, p-tertiary butyl styrene or methyl methacrylate, c. 10-90 parts by weight of at least one acrylic acid ester having 1-12 C atoms in the alcohol group and/or at least one methacrylic acid ester having 2-12 C-atoms in the alcohol group, d. 0-30 parts by weight of at least one α,β-monoolefinically unsaturated mono- or dicarboxylic acid having 3-5 C-atoms and/or dicarboxylic acid having 3-5 C-atoms and/or at least one maleic acid semi-ester having 2-14 C-atoms in the alcohol group, or reaction products thereof with a monoglycidyl compound, e. 0-50 parts by weight of at least one acrylic or methacrylic acid glycidyl ester, or reaction products thereof with aliphatic and/or aromatic monocarboxylic acids and amino compounds, f. 0-40 parts by weight of an acrylic or methacrylic acid amide having 1-20 C-atoms in the amino group, or alkoxylated hydroxymethyl acrylic acid amides which may also be produced in situ, and g. 0-60 parts by weight of acrylonitrile, with the sum of the parts by weight of reactants (a) through (g) being 100;

component B is 97-1 parts by weight of alkyd resins and/or oil-free polyesters; and component C is 0.5-50 parts by weight of at least one polysiloxane having hydroxyl and/or alkoxy groups.

2. The binder according to claim 1 wherein the reaction is continued until 30-70% of the theoretically possible amount of water or alcohol has been eliminated.

3. The binder according to claim 1 wherein the reaction is at 160°-200° C. without solvent.

4. The binder according to claim 1 wherein the reaction is at 80°-100° C. in the presence of a solvent.

* * * * *